(12) United States Patent
Augenstein et al.

(10) Patent No.: US 12,479,378 B2
(45) Date of Patent: Nov. 25, 2025

(54) APPARATUS COMPRISING AN INVERTER

(71) Applicant: THERMO KING LLC, Minneapolis, MN (US)

(72) Inventors: Eckardt Augenstein, Essen (DE); Isabel Coenen, Alpen Nordrhein-Westfalen (DE); Matthias Gorski, Bochum (DE); Alexander Iglizn, Erkrath (DE); Vikram Madineni, Dusseldorf (DE)

(73) Assignee: THERMO KING LLC, Minneapolis, MN (US)

( * ) Notice: Subject to any disclaimer, the term of this patent is extended or adjusted under 35 U.S.C. 154(b) by 50 days.

(21) Appl. No.: 18/451,257

(22) Filed: Aug. 17, 2023

(65) Prior Publication Data

US 2024/0059235 A1 Feb. 22, 2024

(30) Foreign Application Priority Data

Aug. 17, 2022 (EP) .................... 22190776

(51) Int. Cl.
*B60R 16/03* (2006.01)
*B60P 3/20* (2006.01)
(Continued)

(52) U.S. Cl.
CPC .............. *B60R 16/03* (2013.01); *B60P 3/20* (2013.01); *H02J 3/0075* (2020.01);
(Continued)

(58) Field of Classification Search
CPC .......... B60H 1/32; B60R 16/03; H02J 3/0075; H02J 7/00712
See application file for complete search history.

(56) References Cited

U.S. PATENT DOCUMENTS 5,184,291 A 2/1993 Crowe et al.
6,070,650 A * 6/2000 Inoue .................... B60L 50/16
62/244

(Continued)

FOREIGN PATENT DOCUMENTS

DE 202016104380 8/2016

OTHER PUBLICATIONS

Extended European Search Report, issued in the corresponding EP patent application No. 22190776.9, dated Jan. 30, 2023, 7 pages.

*Primary Examiner* — Rexford N Barnie
*Assistant Examiner* — Thai H Tran
(74) *Attorney, Agent, or Firm* — HSML P.C.

(57) ABSTRACT

The present disclosure relates to an apparatus for supplying electrical power to a transport refrigeration unit. The apparatus comprises: a power converter including a rectifier, a first inverter and a DC link; a power distribution unit electrically coupled to the DC link; and a second inverter with an input for electrically connecting to an electrical generator and an output for electrically connecting to the power distribution unit or the DC link. The DC link is electrically connected to an output of the rectifier and an input of the first inverter. An input of the rectifier is electrically connectable to a power source external to the apparatus. An output of the first inverter is electrically couplable to the transport refrigeration unit. The second inverter is configured to convert an alternating current voltage supplied at the input into a direct current voltage for supply at the output.

15 Claims, 6 Drawing Sheets

(51) Int. Cl.
*H02J 3/00* (2006.01)
*H02J 7/00* (2006.01)
*H02P 27/06* (2006.01)

(52) U.S. Cl.
CPC .......... *H02J 7/00712* (2020.01); *H02P 27/06* (2013.01); *H02J 2207/20* (2020.01)

(56) References Cited

U.S. PATENT DOCUMENTS

| | | | |
|---|---|---|---|
| 2014/0211520 A1* | 7/2014 | Zhang | H02M 1/126 363/37 |
| 2016/0204607 A1* | 7/2016 | Rogers, Jr. | H02J 3/28 307/31 |
| 2017/0349078 A1* | 12/2017 | Dziuba | B60H 1/00428 |
| 2018/0370383 A1 | 12/2018 | Schumacher | |
| 2022/0274504 A1* | 9/2022 | Douglass | B60L 50/64 |

* cited by examiner

APPARATUS COMPRISING AN INVERTER

FIELD OF THE INVENTION

The present disclosure relates to an apparatus configured to supply electrical power to a transport refrigeration unit, the apparatus comprising a power converter and an inverter configured to be electrically connected to an electrical generator.

BACKGROUND OF THE INVENTION

It is known for a transport refrigeration unit (TRU) to comprise at least one component which requires a supply of alternating current electrical power for operation. When a TRU is not in transit, it may be that the TRU receives at least part of the required supply of alternating current electrical power for operation from an external AC power source such as a public or a private electrical grid (sometimes referred to as "shore power"). Otherwise, when the TRU is in transit, it may be that the TRU receives at least part the required supply of alternating current electrical power for operation from an internal AC power source such as an electrical generator, or it may be that the at least part of the required supply of alternating current electrical power is supplied by an internal DC power source, such as a battery, via a suitable DC-AC conversion system.

It may be that a set of characteristics of the alternating current electrical power supplied by the external AC power source render the alternating current electrical power supplied by the external AC power source unsuitable or sub-optimal for supplying directly to the TRU. For example, it may be that the alternating current electrical power provided to the TRU should preferably have a frequency and/or a root mean square voltage which differs from the frequency and/or the root mean square voltage of the alternating current electrical power supplied by the external AC power source. A power converter may be provided for the purpose of converting the alternating current electrical power supplied by the external AC power source into a suitable alternating current electrical power for subsequent delivery to the TRU.

Increasingly, it is considered advantageous to provide a diverse range of internal power sources to supply electrical power for operation of a TRU. It is therefore desirable to provide an improved apparatus for supplying electrical power to a TRU.

SUMMARY OF THE INVENTION

According to a first aspect, there is provided an apparatus configured to supply electrical power to a transport refrigeration unit, the apparatus comprising: a power converter including a rectifier, a first inverter and a DC link, internal to the power converter, the DC link being electrically connected to an output of the rectifier and an input of the first inverter, an input of the rectifier being electrically connectable to a power source external to the apparatus at a connection port (170) of the apparatus and an output of the first inverter being electrically couplable to the transport refrigeration unit; a power distribution unit electrically coupled to the DC link of the power converter; and a second inverter having an input configured to be electrically connected to an electrical generator and an output electrically connected to the power distribution unit or to the DC link of the power converter, wherein the second inverter is configured to convert an alternating current voltage supplied at the input into a direct current voltage for supply to the power distribution unit or to the DC link of the power converter at the output. The apparatus may comprise the transport refrigeration unit.

The apparatus may further comprise a battery electrically coupled to the power distribution unit. It may be that the power distribution unit is configured to isolate the DC link from the battery and/or the second inverter when connected to the power distribution unit. The power distribution unit may comprise a plurality of thermal fuses, and wherein each of the plurality of thermal fuses is configured to isolate the DC link from the battery or the second inverter.

It may be that the second inverter is configured to convert a variable-frequency alternating current voltage supplied at the input into a direct current voltage for supply to the power distribution unit at the output.

The apparatus may further comprise a DC-DC converter connected between the DC link of the power converter and the power distribution unit, the DC-DC converter being configured to: convert a voltage supplied to the DC-DC converter by the power distribution unit from a second voltage magnitude to a first voltage magnitude for supply to the DC link, the first voltage magnitude corresponding to an operating voltage of the DC link and the second voltage magnitude corresponding to an operating voltage of the power distribution unit; and convert a voltage supplied to the DC-DC converter by the DC link from the first voltage magnitude to the second voltage magnitude for supply to the power distribution unit. The DC-DC converter may comprise at least one isolation device configured to selectively isolate the DC link from the PDU.

The output of the first inverter may be electrically coupled to the transport refrigeration unit via an output sine-wave filter. The input of the rectifier may be electrically couplable to the external power source via an input filter. It may be that the power converter comprises the input filter and/or the output sine-wave filter if present.

It may be that the apparatus further comprises a controller configured to: determine whether the external power source is connected at the connection port; and manage electrical power flow within the apparatus according to whether the external power source is connected at the connection port.

The controller being configured to manage electrical power flow within the apparatus according to whether the external power source is connected at the connection port may include the controller being configured to: in response to a determination that the external power source is not connected at the connection port: determine a power demand of the transport refrigeration unit, a power availability associated with the electrical generator and a state of charge of the battery; and control electrical power flow within the apparatus based on the determined power availability associated with the electrical generator, the determined power demand of the transport refrigeration unit and the determined state of charge of the battery.

The controller being configured to manage electrical power flow within the apparatus according to whether the external power source is connected at the connection port includes the controller being configured to: in response to a determination that the external power source is connected at the connection port: determine a power demand of the transport refrigeration unit, a power availability associated with the external power source and a state of charge of the battery; and control electrical power flow within the apparatus based on the determined power availability associated with the external power source, the determined power demand of the transport refrigeration unit and the state of charge of the battery.

The controller being configured to manage electrical power flow within the apparatus according to whether the external power source is connected at the connection port includes the controller being configured to: in response to a determination that the external power source is connected at the connection port: in response to a determination that excess electrical energy is present within the apparatus, cause electrical power to be supplied from the power converter to the external power source so as to discharge excess electrical energy stored within the apparatus to the external power source.

According to a second aspect, there is provided a vehicle comprising the apparatus according to the first aspect and an electrical generator, wherein the electrical generator is mechanically coupled to an axle of the vehicle.

DETAILED DESCRIPTION

The disclosure generally relates to an apparatus configured to supply electrical power to a transport refrigeration unit (TRU). More specifically, the present disclosure relates to a mobile climate-controlled module having a TRU, an apparatus configured to supply electrical power to the TRU and a climate-controlled compartment. Exemplary mobile climate-controlled modules include an over-the-road trailer, an over-the road truck body, a bus, a transport container and a railway car. The climate-controlled compartment can take the form of multiple compartments or have multiple zones.

Figure 1:
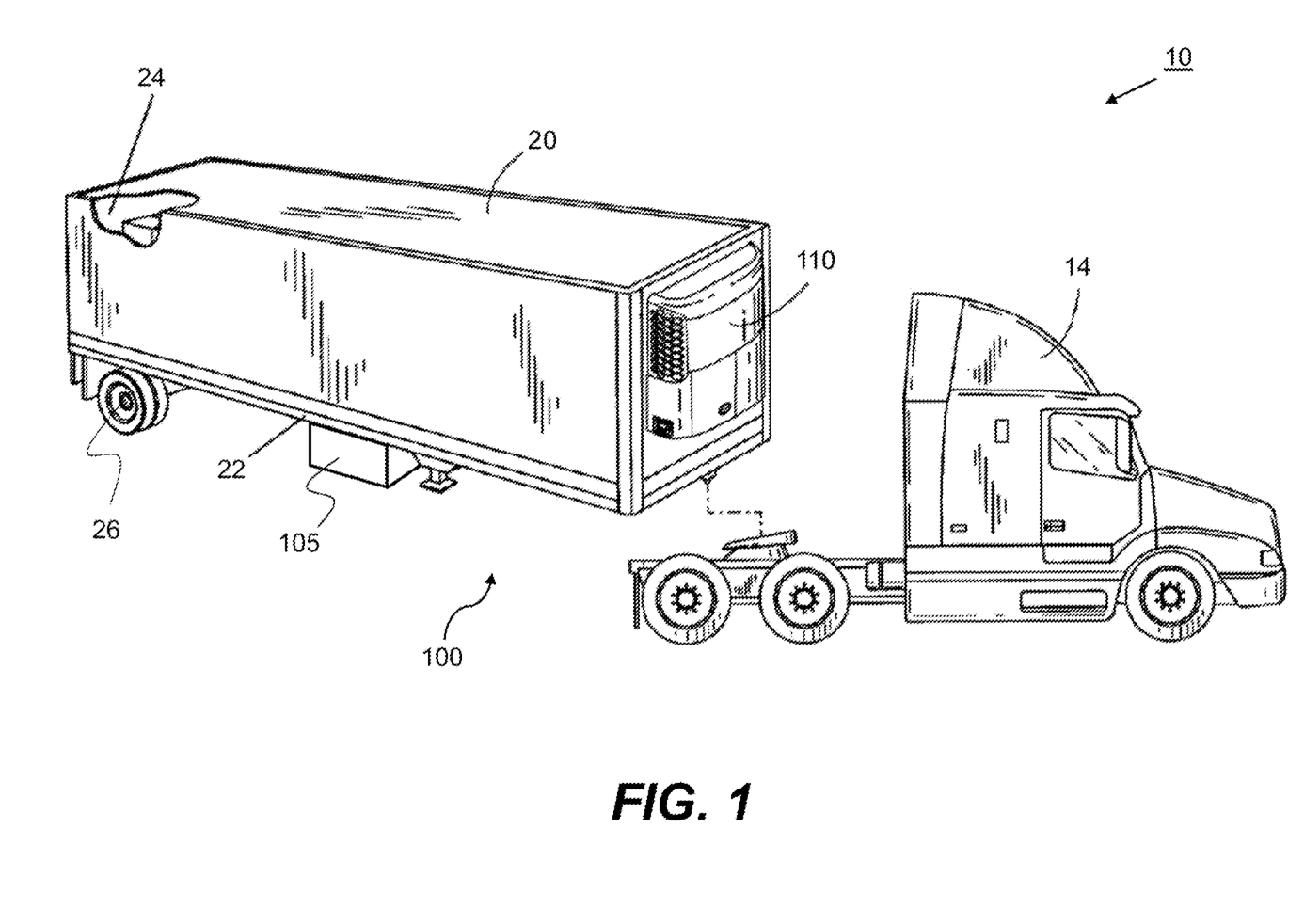
FIG. 1 shows a vehicle comprising a climate-controlled module.

FIG. 1 shows a vehicle 10 comprising a climate-controlled module 20. In the example of FIG. 1, the climate-controlled module 20 is an over-the-road refrigerated semi-trailer 20 having a structure 22 supporting (or forming) a single climate-controlled compartment 24 which is configured to be cooled and/or heated by a TRU 110. The structure 22 includes a chassis. The vehicle 10 comprises an apparatus 100 which includes various components disposed within an under-chassis box 105. In some examples, one or more components of the apparatus 100 may be integrated or incorporated into the TRU 110. The structure 22 supports the TRU 110 and the under-chassis box 105. The vehicle 10 further comprises a tractor unit 14 removably couplable to the trailer 20. The vehicle 10 comprises at least an axle 26, to which an electrical generator as described below with reference to FIG. 2 may be mechanically coupled. Although the axle 26 is shown as being provided as part of the over-the-road refrigerated semi-trailer 20 in the example of FIG. 1, this need not be the case. For instance, it may be that the axle 26 is provided as part of the tractor unit 14.

Figure 2A:
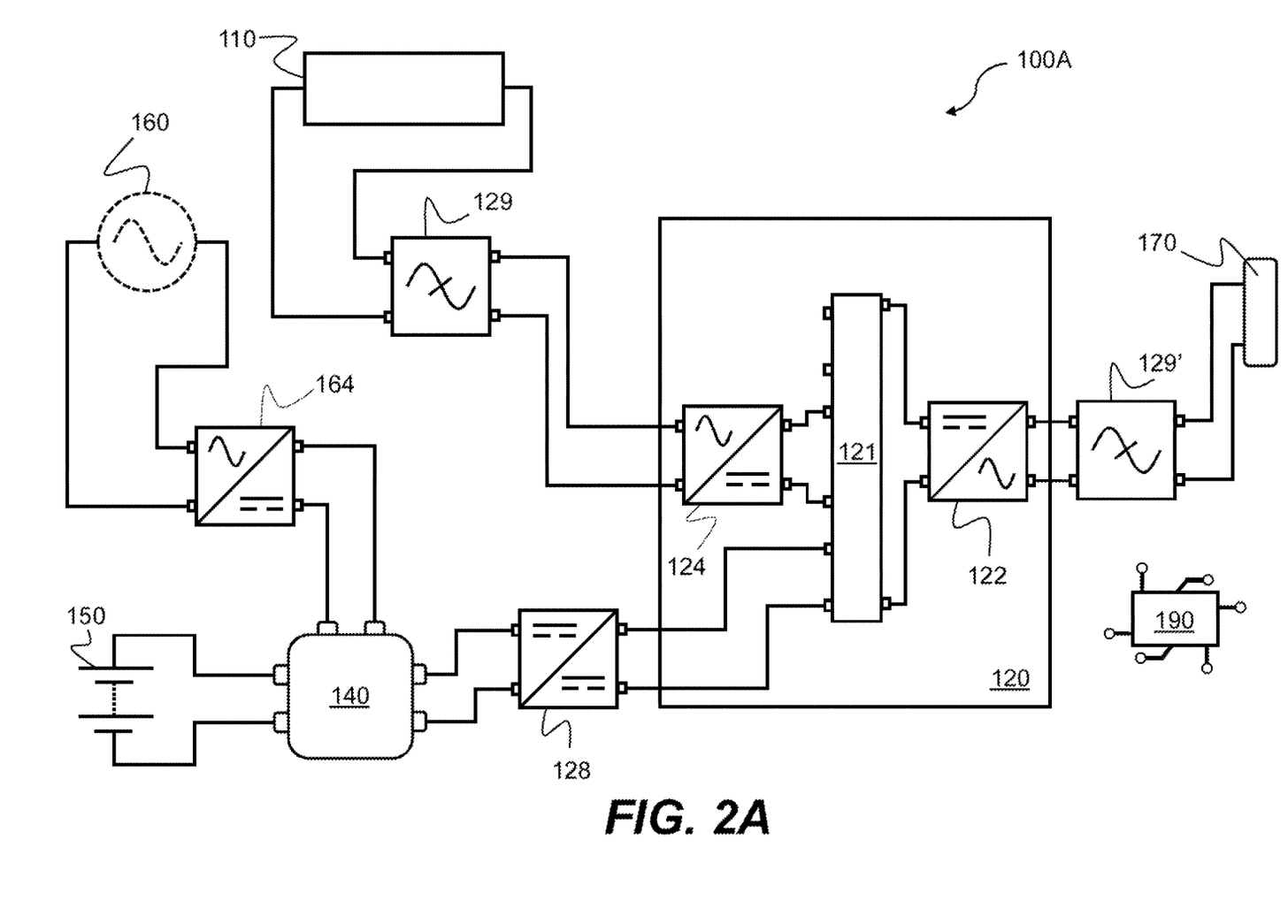
FIG. 2A is a diagram which shows a first example topology of an example apparatus.
Figure 2B:
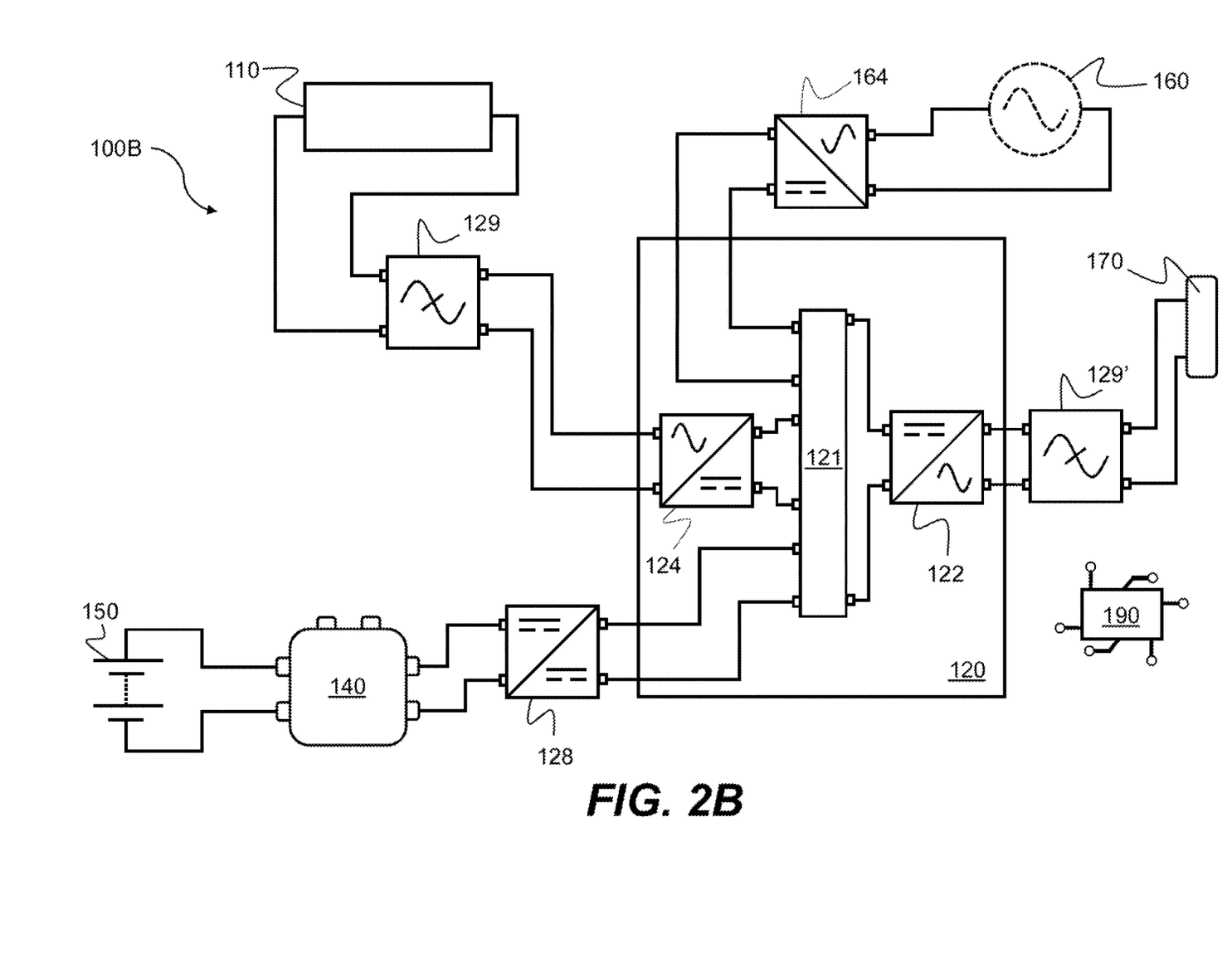
FIG. 2B is a diagram which shows a second example topology of an example apparatus.

FIG. 2A shows a diagram of a first example topology 100A of an apparatus 100 configured to supply electrical power to a transport refrigeration unit (TRU) 110. FIG. 2B shows a diagram of a second example topology 100B of an apparatus 100 configured to supply electrical power to a transport refrigeration unit (TRU) 110. The apparatus 100 may be configured to supply monophase or polyphase (e.g. three phase) electrical power to the TRU 110. In some embodiments of the disclosure, the apparatus 100 may include the TRU 110, but it is to be understood that the apparatus 100 need not include the TRU 110.

The TRU 110 may comprise at least one temperature control component which requires a supply of electrical power for operation. In particular, the TRU 110 may comprise a refrigeration circuit including at least one fan, at least one pump and/or at least one gas exchange module. The refrigeration circuit includes at least one compressor, at least one condenser, at least one evaporator and at least one expansion device. At least one component of the TRU 110 requires a supply of an alternating current (AC) electrical power for operation, and the TRU 110 may generally be considered to comprise any suitable combination of a resistive load, an inductive load and/or a capacitive load. Consequently, the TRU 110 may be considered to be a power sink having an associated power demand. The apparatus 100 may be incorporated within a mobile climate-controlled module including a climate-controlled compartment, such as the climate-controlled module 20 and the climate-controlled compartment 24 shown in FIG. 1. Accordingly, the apparatus 100 is generally configured for use in transit. The apparatus 100 provides a flexible arrangement in which multiple power sources and or power sinks may be coupled or connected to a TRU 110 so as to meet the power demand of the TRU 110 in use.

The apparatus 100 comprises a power converter 120 including a DC link 121 internal to the power converter 120, a rectifier 122 and an inverter 124. For clarity purposes, the inverter 124 of the power converter 120 is referred to herein as the first inverter 124 in order to clearly distinguish it from the other inverter 164 of the apparatus 100 described below. However, it will be appreciated that the use of the term first inverter 124 is not intended to imply that the power converter 120 may necessarily comprise more than one inverter.

An output of the rectifier 122 is electrically connected to the DC link 121 and an input of the first inverter 124 is also electrically connected to the DC link 121. An input of the rectifier 122 is electrically couplable to an AC power source external to the apparatus 100 at a connection port 170 of the apparatus 100. A power source is external to the apparatus 100 in the sense that any electrical energy storage capacity or electrical energy generation capacity of the power source is not disposed within the apparatus 100. Generally, the external AC power source may be connected at the connection port 170 when the apparatus 100 is stationary (that is, not in transit), whereas the external AC power source is not connected at the connection port 170 when the apparatus 100 is in transit (that is, not stationary). The external AC power source may be, as a particular example, an electrical grid such as a public or a private electrical grid. When connected at the connection port 170, the external AC power source has an associated power availability.

An output of the first inverter 124 is electrically couplable to the TRU 110. The rectifier 122 and/or the first inverter 124 may comprise one or more power switching components. Each power switching component may include, for example, an insulated gate bipolar transistor (IGBT), a junction-gate field-effect transistor (JFET), a thyristor, and/or a power metal-oxide-semiconductor field-effect transistor (MOSFET). In particular, each power switching component may include a gate turn-off thyristor (GTO) and/or an integrated gate-commutated thyristor (ICGT).

In use, the rectifier 122 receives an AC electrical power input supplied to its input (e.g. from the external AC power source) and converts it into a DC power output which is then supplied to the DC link 121 via the output of the rectifier 122. Conversely, the first inverter 124 receives a DC electrical power input supplied to its input by the DC link 121 and converts it into an AC power output, suitable for supplying the TRU 110. It may be that at least one component of the TRU 110 requires a supply of direct current (DC) electrical power for operation. To this end, the TRU 110 may comprise a local converter system (not shown) for the purpose of converting AC electrical power supplied by first inverter 124 into DC electrical power.

The apparatus 100 also comprises a power distribution unit (PDU) 140 electrically coupled to the DC link 121 of the power converter 120. The PDU 140 is generally configured to act as an interface between the DC link 121 of the power converter 120 and a variety of other electrical components of the apparatus 100 which may be electrically coupled to the PDU 140 as described in further detail below. The PDU 140 may comprise at least one thermal fuse, such that the PDU is able to rapidly disconnect or decouple the DC link 121 from any components of the apparatus 100 which are electrically coupled to the PDU 140 if a fault current develops within the apparatus 100.

The PDU 140 has a nominal or rated operating voltage. Therefore, any DC electrical voltages which are supplied to the PDU 140 from any electrical components of the apparatus 100 which are electrically coupled to the PDU 140 (including the DC link 121 of the power converter 120) should match the operating voltage of the PDU. Likewise, any DC electrical voltages which are provided to the PDU 140 from any electrical components of the apparatus 100 which are electrically coupled to the PDU 140 (including the DC link 121 of the power converter 120) should match the operating voltage of the PDU. The operating voltage of the PDU 140 may be determined according to a voltage of an electrical component of the apparatus 100 which is electrically coupled to the PDU 140.

In addition, the apparatus 100 includes a second inverter 164 having an input which is configured to be electrically connected to an electrical generator 160 and having an output which is electrically coupled to the power distribution unit 140 (as in the first example topology 100A of the apparatus 100 shown in FIG. 2A) or electrically coupled to the DC link 121 of the power converter 120 (as in the second example topology 100B of the apparatus 100 shown in FIG. 2B). In some embodiments of the disclosure, the apparatus 100 may include the electrical generator 160. The electrical generator 160 generally functions as an internal AC power source in use having an associated power availability. The electrical generator 160 may be a monophase or a polyphase (e.g. three phase) electrical generator. A power source may be internal to the apparatus 100 in the sense that any electrical energy storage capacity or electrical energy generation capacity of the power source is disposed within the apparatus 100 or within a module/vehicle in which the apparatus 100 is incorporated.

The second inverter 164 is configured to convert an alternating current voltage supplied at the input of the second inverter 164 (e.g. as received from the electrical generator 160) into a direct current voltage for supply at the output of the second inverter 164 to the power distribution unit 140 (as in FIG. 2A) or to the DC link 121 (as in FIG. 2B). The second inverter 164 being electrically connectable to the electrical generator 160 provides simple means for incorporating an internal AC power source within the apparatus 100 without unduly increasing the complexity of the apparatus 100.

The electrical generator 160 may, in particular, comprise a kinetic energy recovery system such as an axle-mounted generator. For instance, the electrical generator 160 may be mechanically coupled to the axle 26 of the host vehicle 10 on which the apparatus 100 is mounted or otherwise provided, as shown in FIG. 1. Accordingly, it may be that the electrical generator 160 provides a substantially variable-frequency alternating current voltage to the second inverter 164 in use. Therefore, the second inverter 164 may be adapted to convert a variable-frequency alternating current voltage supplied at the input of the second inverter 164 into the direct current voltage for supply at the output of the second inverter 164 to the power distribution unit 140 (as in FIG. 2A) or to the DC link 121 (as in FIG. 2B). Necessary components of the second inverter 164 which enable the second inverter 164 to perform this function will be apparent to those skilled in the art.

Further, it may be that the apparatus 100 includes an electrical energy storage device 150 (in particular, a battery 150) which is electrically coupled to the PDU 140. Accordingly, the PDU 140 is able to isolate the DC link 121 of the power converter 120 from the battery 150 by decoupling the battery 150 from the power converter 128, to protect the battery 150 from electrical faults originating in another part of the apparatus 100 and vice versa. In such examples, the operating voltage of the PDU 140 corresponds to a voltage of the battery 150. The battery 150 may have a nominal voltage or a rated voltage, which varies according to a state-of-charge (SOC) of the battery 150. If the operating voltage of the PDU 140 is within an acceptable range of the voltage of the battery 150, the battery 150 may be charged (from the inverter 164 and/or from the DC link 121) and/or discharged (into the DC link 121) via the PDU 140. In use, the battery 150 may function as either a internal DC power source or an internal DC power sink, depending on whether it is being discharged or charged, respectively. A power sink may be internal to the apparatus 100 in the sense that any electrical energy storage capacity or electrical energy consumption capacity of the power sink is not disposed within the apparatus 100. Similarly, a power source may be internal to the apparatus 100 in the sense that any electrical energy storage capacity or electrical energy generation capacity of the power source is disposed within the apparatus 100 or within a module/vehicle in which the apparatus 100 is incorporated.

The arrangement of the apparatus 100 enables electrical power to be supplied from the electrical generator 160 without a need for any electrical power to be passed through the battery 150. In other words, the battery 150 need not be directly charged by the electrical generator 160 in order for power to be supplied from the electrical generator 160 to the TRU 110. This reduces a number of charging and discharging cycles applied to the battery 150 over time, which reduces a cyclic degradation of the battery 150, thereby increasing a mean time between failures of the battery 150 and therefore extending an expected service life of the apparatus 100.

Additionally, the apparatus 100 may comprise a DC-DC converter 128 coupled between the DC link 121 of the power converter 120 and the PDU 140 and operative to convert a DC voltage at a second magnitude supplied to the DC-DC converter 128 by the PDU 140 to a DC voltage at a first magnitude for supply to the DC link 121 of the power converter 120, and to convert a DC voltage at the first magnitude supplied to the DC-DC converter 128 by the DC link 121 of the power converter to a DC voltage at the second magnitude for supply to the PDU 140. The DC-DC converter 128 may include a low-pass filter for removing high-frequency variations (e.g. high frequency components arising due to switching of the DC-DC converter or the inverter 164) in the electrical power supplied by the DC-DC converter 128. The DC-DC converter 128 may comprise at least one galvanic isolation device, such that the DC-DC converter 128 is able to selectively isolate the PDU 140 from the DC link 121, for example in response to the development of a fault current between the PDU 140 and the DC link 121 for improved safety of the apparatus 100. If present, the DC-DC converter 128 may be disposed within a housing of the power converter 120 such that the power converter 120 comprises the DC-DC converter 128. The DC-DC converter 128 allows the operating voltages of the DC link 121 and the PDU 140, respectively, to be dissimilar. Specifically, the inclusion of the DC-DC converter 128 allows the operating voltage of the DC link 121 to be significantly greater than the operating voltage of the PDU 140 and also allows the operating voltage of the PDU 140 to freely vary as the voltage of the battery 150 varies without having any adverse effects on effective operation of the apparatus 100.

Depending on whether the battery 150 is being charged or discharged, the DC-DC converter 128 performs different functions. When the battery 150 is being charged, the DC-DC converter 128 converts the voltage supplied from the DC link 121 at the operating voltage of the DC link 121 (that is, a voltage having the first voltage magnitude) to a voltage for supply to the PDU 140 at the operating voltage of the PDU 140 (that is, a voltage having the second voltage magnitude, the first voltage magnitude being greater than the second voltage magnitude). Otherwise, when the battery 150 is being discharged, the DC-DC converter 128 converts the voltage supplied from the PDU 140 at the operating voltage of the PDU 140 (that is, a voltage having the second voltage magnitude) to a voltage for supply to the DC link 121 at the operating voltage of the DC link 121 (that is, a voltage having the first voltage magnitude). Accordingly, the DC-DC converter 128 may be considered to be a buck-boost DC-DC converter. The DC-DC converter 128 may comprise a variety of electrical components required in order to function as a buck-boost DC-DC converter, as will be apparent to those skilled in the art.

The first voltage magnitude is the magnitude of the operating voltage of the DC link 121. In order to ensure that the first inverter 124 of the power converter 120 is able easily to provide an AC power output which meets the required voltage for the AC electrical power to be provided to the TRU 110 across a broad range of operating conditions, the operating voltage of the DC link 121 (and therefore the first voltage magnitude) may be selected so as to be in a range between 600 VDC and 800 VDC. Preferably, the operating voltage of the DC link 121 may be approximately 700 VDC. The second voltage magnitude is the magnitude of the operating voltage of the PDU 140, which in turn corresponds to the output/terminal voltage of the battery 150. Depending on the SOC of the battery 150, the second voltage magnitude may typically vary within a range between 300 VDC and 450 VDC.

As shown in the example topologies 100A, 100B of FIGS. 2A and 2B respectively, the output of the first inverter 124 may be electrically couplable to the TRU 110 via an output sine-wave filter 129. The output sine-wave filter 129 is generally configured to increase a degree to which a time-domain profile of an AC electrical power supplied to the TRU 110 in use conforms to a substantially sinusoidal profile. To this end, it may be that the output sine-wave filter 129 comprises a low-pass filter configured to attenuate high frequency components (i.e. components above an upper threshold frequency) of the AC electrical power that is supplied to the TRU 110 in use, such that the time-domain profile of the AC electrical power supplied to the TRU is primarily composed of frequency components below the upper-frequency threshold, which in turn results in an increase in the degree to which the time-domain profile of an AC electrical power supplied to the TRU 110 conforms to a substantially sinusoidal profile. In addition to the low-pass filter, the output sine-wave filter 129 may comprise a high-pass filter configured to attenuate any low frequency components (i.e. components below a lower frequency threshold) of the AC electrical power that is supplied to the TRU 110 in use, such that the time-domain profile of the AC electrical power supplied to the TRU is primarily composed of frequency components between the lower-frequency threshold and the upper-frequency threshold. This may further increase the degree to which the time-domain profile of an AC electrical power supplied to the TRU 110 conforms to a substantially sinusoidal profile. As will be appreciated by those of ordinary skill in the art, equivalent functionality can be achieved through the use of a band pass filter, configured with a suitable pass band, as the output sine-wave filter 129.

It may be that for optimal operation, the TRU 110 should receive a supply of an AC electrical power supply having a substantially sinusoidal time-domain profile is beneficial. However, it may be that a time-domain profile of an AC electrical power provided by the output of the first inverter 124 is substantially non-sinusoidal. For instance, the time-domain profile of the AC electrical power provided by the output of the first inverter 124 may substantially conform to a rectangular or square wave, or another non-sinusoidal wave. Electrical coupling of the output of the first inverter 124 to the TRU 110 via the output sine-wave filter 129 increases the conformity of the time-domain profile of the AC electrical power provided to the TRU 110 to a substantially sinusoidal profile, and therefore enables more effective operation of the TRU 110.

As also shown in the example topologies 100A, 100B of FIGS. 2A and 2B respectively, the input of the rectifier 122 may be electrically couplable to the external AC power source at the connection port 170 via an input filter 129'. The input filter 129' is generally configured to remove noise from an AC electrical power supplied to the power converter 120 in use. For this purpose, the input filter 129' may comprise at least one low-pass filter as described above with respect to the output sine-wave filter 129. It may be that the operation of rectifier 122 is improved when the supply of AC electrical power does not contain a significant amount of noise. The input filter 129' may therefore enable more effective operation of the rectifier 122 and the power converter 120 as a whole.

In some examples, the output sine-wave filter 129 and/or the input filter 129', if present, is/are disposed within the housing of the power converter 120, such that the power converter 120 comprises the output sine-wave filter 129 and/or the input filter 129'. However, it will also be appreciated that in other examples, the output of the first inverter 124 is not electrically couplable to the TRU 110 via the output sine-wave filter 129 and/or the input of the rectifier 122 is not electrically couplable to the external AC power source via the input filter 129'.

The apparatus 100 further comprises a controller 190. The controller 190 is generally configured to operate the apparatus 100 in accordance with the methods described below with reference to FIGS. 3A to 3C.

Figure 3A:
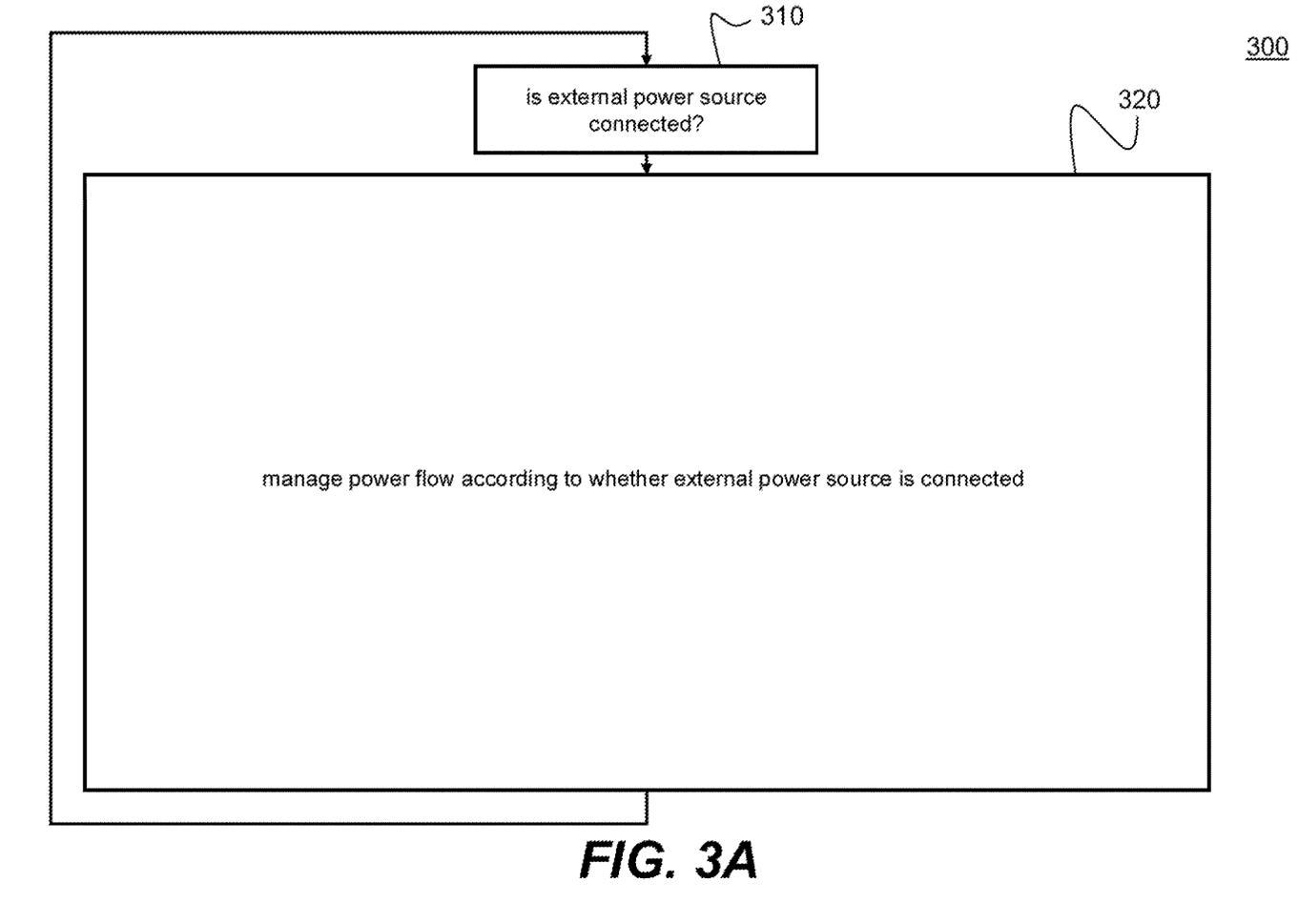
FIG. 3A is a flowchart which shows an example method of operating the example apparatus of FIGS. 2A and 2B.

FIG. 3A is a flowchart which shows a method 300 of operating the apparatus 100. The method 300 comprises a step 310 and a step 320. In step 310, the controller 190 determines whether an external AC power source is connected at the connection port 170. The apparatus 100 may comprise a dedicated sensor for the purpose of monitoring whether an external AC power source is connected at the connection port 170, such as, for example, an impedance sensor. The controller 190 may receive a signal output by the sensor and determine whether an external AC power source is connected at the connection port 170 based on the signal.

The method 300 then proceeds to step 320. In step 320, the controller 190 manages electrical power flow within the apparatus 100 in accordance with the determination made in step 310. The controller 190 may control power flow within the apparatus 100 by controlling operation of the power converter 120 (e.g. the rectifier 122 and/or the first inverter 124), controlling operation of the DC-DC converter 128, controlling operation of the second inverter 164 and/or controlling operation of the PDU 140. Following step 320, the method returns to step 310 such that the abovementioned process is repeated.

In general, at step 320 the controller 190 manages power flow within the apparatus 100 so as to ensure that the power demand of the TRU 110 is met (that is, the controller 190 performs load and source balancing to ensure that the power demand of the TRU 110 is met). As described above, the TRU 110 functions as an internal DC power sink in use. It follows that, when the TRU 110 is in operation, sufficient electrical power must be supplied to the TRU 110 from a suitable combination of internal DC power sources (e.g. the battery 150 when being discharged), internal AC power sources (e.g. the electrical generator 160) and/or external AC power sources (e.g. as connected at the connection port 170) as available and applicable to meet the power demand of the TRU 110.

Figure 3B:
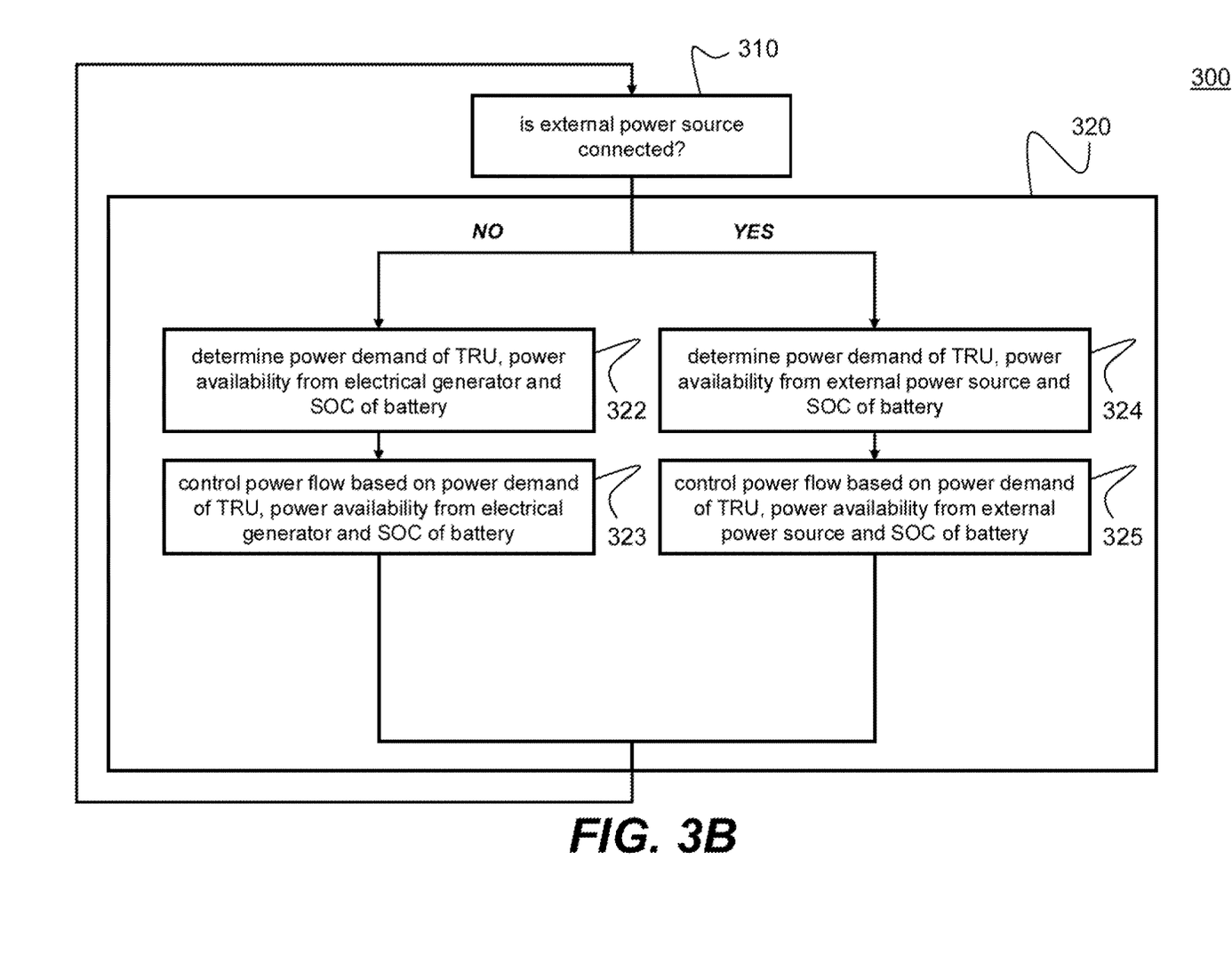
FIG. 3B is a flowchart which shows a first example implementation of the example method of FIG. 3A.

FIG. 3B is a flowchart which shows a first example implementation of the example method 300 of controlling the apparatus 100. In the first example implementation, step 320 comprises a step 322, a step 323, a step 324 and a step 325. If the determination made in step 310 is negative (that is, in response to a determination that the external AC power source is not connected at the connection port 170), the method proceeds through step 322 and step 323 in sequence. On the other hand, if the determination made in step 310 is positive (that is, in response to a determination that the external AC power source is connected at the connection port 170), the method 300 proceeds through step 324 and step 325 in sequence. After the method 300 has proceeded through either steps 322 and 323 or steps 324 and 325, the method 300 returns to step 310 as described above with reference to FIG. 3A.

Step 322 includes determining the power demand of the TRU 110, the power availability associated with the electrical generator 160 and the state-of-charge (SOC) of the battery 150. The power demand of the TRU 110 may be determined by monitoring an operating parameter of the TRU 110. The operating parameter of the TRU 100 may be, for example, an electrical current draw, an operating condition of an internal component such as a compressor of the TRU 110, a heating demand of the TRU 110, a cooling demand of the TRU 110 or similar. The power availability from the electrical generator 160 may be determined by monitoring an electrical current and/or an electrical voltage provided to the second inverter 164 or provided from the second inverter 164 and the SOC of the battery 150 may be determined by monitoring a voltage across a pair of terminals of the battery 150.

Step 323 comprises controlling electrical power flow within the apparatus based on the power availability associated with the electrical generator 160, the power demand of the TRU 110 and the state-of-charge of the battery 150 as determined in step 322. For instance, it may be that the power availability associated with the electrical generator 160 is equal to the power demand of the TRU 110 and therefore the electrical generator 160 is able to provide sufficient electrical power to meet the power demand of the TRU 110 without a need to discharge the battery 150. Further, it may be that the power availability associated with the electrical generator 160 is greater than the power demand of the TRU 110 and hence the electrical generator 160 is able to provide sufficient electrical power to meet the power demand of the TRU 110 and also to charge the battery 150. Accordingly, the controller may cause the battery 150 to be charged so as to function as an internal DC power sink and thereby store additional power which is not necessary to meet the power demand of the TRU 110 for future utilisation. For these purposes, the controller 190 may, for example, control operation of the DC-DC converter 128 and/or the second inverter 164 so as to provide adequate power to the DC link 121 of the power converter 120 from the PDU 140 for subsequent supply to the TRU 110.

However, it may be that the battery 150 is already fully charged or sufficiently charged that further charging of the battery 150 would be unnecessary and/or likely to cause damage and/or degradation to the battery 150. If so, it may be that the controller 190 prevents further charging of the battery 150. As an example, the controller 190 may compare the determined SOC of the battery 150 to an upper SOC threshold. If the determined SOC of the battery 150 exceeds the upper SOC threshold, the controller may prevent further charging of the battery 150. The upper SOC threshold may correspond to an upper limit of charging of the battery below which damage to the battery due to overcharging is unlikely. The controller 190 may, for example, prevent further charging of the battery 150 by isolating the battery 150 from the electrical generator 160 and/or the power converter 120 using the PDU 140.

Otherwise, it may be that power availability associated with the electrical generator 160 is less than the power demand of the TRU 110 and hence the electrical generator 160 is not able to provide sufficient electrical power to meet the power demand of the TRU 110 without discharging the battery 150. Therefore, the controller 190 may cause the battery 150 to be discharged so as to function as an internal DC power source and thereby provide additional power necessary to meet the power demand of the TRU 110. At some points in time during use, it may be that there is no power availability associated with the electrical generator 160 (that is, the electrical generator 160 is not generating electrical power). If so, the controller 190 causes the battery 150 to be discharged so as to function as an internal DC power source and thereby provide all of the power necessary to meet the power demand of the TRU 110. To achieve this, the controller 190 may, for instance, control operation of the DC-DC converter 128 so as to provide power to the DC link 121 of the power converter 120 from the PDU 140 for subsequent supply to the TRU 110.

Step 324 includes determining the power demand of the TRU 110 and the state-of-charge (SOC) of the battery 150. The power demand of the TRU 110 and the SOC of the battery 150 may be determined in the ways described above with respect to step 322. Step 324 also comprises determining a power availability associated with the external AC power source connected at the connection port 170. The power availability associated with the external AC power source connected at the connection point 180 may be determined based on a control signal provided at the connection port 170 by, for example, a charging station which acts as an interface between the external AC power source and the connection port 170.

Step 325 comprises controlling electrical power flow within the apparatus based on the power demand of the TRU 110, the state-of-charge of the battery 150 and the power availability associated with the external AC power source as determined in step 324. For instance, it may be that the power availability associated with the external AC power source is equal to the power demand of the TRU 110 and therefore the external AC power source is able to provide sufficient electrical power to meet the power demand of the TRU 110 without a need to discharge the battery 150 but without being able to charge the battery 150 either. In such circumstances, the controller 190 may simply control operation of the power converter 120 to meet the power demand of the TRU 110.

Alternatively, it may be that the power availability associated with the external AC power source is greater than the power demand of the TRU 110 and hence the external AC power source is able to provide sufficient electrical power to meet the power demand of the TRU 110 and also to charge the battery 150. Accordingly, the controller may cause the battery 150 to be charged so as to function as an internal DC power sink and thereby store additional power which is not necessary to meet the power demand of the TRU 110 for future utilisation. If so, the controller 190 may control operation of the DC-DC converter 128 so as to provide power to the PDU 140 for the purpose of charging the battery 150.

Nevertheless, it may be that the battery 150 is already fully charged or sufficiently charged that further charging of the battery 150 would be unnecessary and/or likely to cause thermal damage to the battery 150. If so, it may be that the controller 190 prevents further charging of the battery 150 in a similar way to that described above with respect to step 323.

Alternatively, the power availability associated with the external AC power source may be less than the power demand of the TRU 110 and hence the external power source is not able to provide sufficient electrical power to meet the power demand of the TRU 110 without discharging the battery 150. Therefore, the controller 190 may control the DC-DC converter 128 to cause the battery 150 to be discharged so as to function as an internal DC power source and thereby provide additional power to the DC link 121 of the power converter 120 necessary to meet the power demand of the TRU 110.

This disclosure anticipates that step 324 may also comprise determining the power availability associated with the electrical generator 160 and that step 325 includes controlling power flow based on the power availability associated with the electrical generator 160. Nevertheless, if the electrical generator 160 is a kinetic energy recovery system such as an axle-mounted generator, the electrical generator 160 will not generate any electrical power when the external AC power source is connected at the connection port 170 and the apparatus is not in transit. Therefore, step 324 may generally omit determining the power availability associated with the electrical generator 160 and step 325 may not include controlling power flow based on the power availability associated with the electrical generator 160.

Figure 3C:
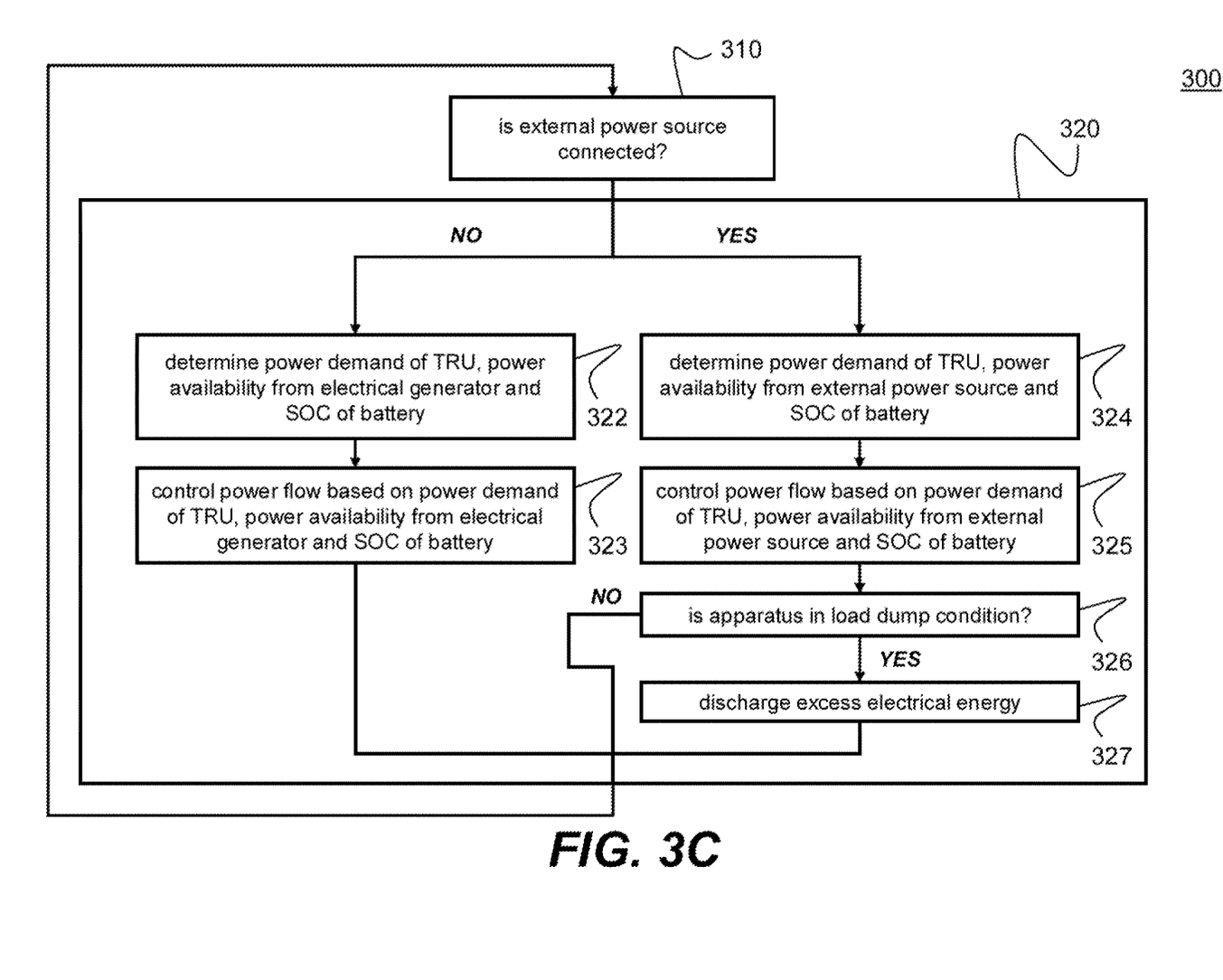
FIG. 3C is a flowchart which shows a second example implementation of the example method of FIG. 3A.

FIG. 3C is a flowchart which shows a second example implementation of the example method 300 of controlling the apparatus 100. The second example implementation shown in FIG. 3C is generally similar to the first example implementation shown in FIG. 3B, with like reference numerals denoting common or similar features. However, in the second example implementation step 320 further comprises a step 326 and a step 327 which may follow step 325 in sequence. Consequently, if the determination made in step 310 is positive (that is, in response to a determination that the external AC power source is connected at the connection port 170), the method proceeds through step 324, step 325, step 326 and step 327 in sequence. After the method 300 has proceeded through either steps 322 and 323 or steps 324, 325, 326 and 327, the method 300 returns to step 310 as described above with reference to FIGS. 3A and 3B.

In step 326, the method 300 includes determining whether the apparatus 100 is in a "load dump" (or a "load shedding") condition, which may occur, for example when a load is electrically decoupled from the other components of the apparatus 100 in use. When the load is electrically decoupled from the other components, an excess voltage condition could arise within the DC link 121 of the apparatus 100. An excess voltage condition occurs when the voltage of the DC link 121 exceeds a nominal or a rated voltage of the DC link 121. Accordingly, it may be necessary to dynamically dissipate electrical energy from the apparatus 100 to the external AC power source to avoid such an excess voltage condition. If the determination in step 326 is negative (that is, the apparatus 100 is not in a load dump condition), the method 300 returns directly to step 310. During operation of the apparatus 100, the determination in step 326 will be typically negative. However, in some abnormal or atypical operating conditions for the apparatus 100, the determination in step 326 will be positive. If the determination in step 326 is positive (that is, the apparatus 100 is in a load dump condition), the method 300 proceeds to step 327.

Within step 327, the method includes causing electrical power to be supplied from the power converter 120 to the external AC power source to discharge excess electrical energy stored within the apparatus 100 to the external power source and thereby prevent the DC link 121 from entering an excess voltage condition. For this purpose, the controller 190 may control the rectifier 122 so as to function as an inverter and thereby dissipate stored electrical energy to the external power source.

It should be understand that the method steps shown in each of FIGS. 3A to 3C may be performed in any suitable order, and/or that the specific content of each step may be varied while still achieving the desired control outcomes described above.

The controller(s) described herein may comprise a processor. The controller and/or the processor may comprise any suitable circuitry to cause performance of the methods described herein and as illustrated in the drawings. The controller or processor may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU), to perform the methods and or stated functions for which the controller or processor is configured.

The controller or the processor may comprise or be in communication with one or more memories that store that data described herein, and/or that store machine readable instructions (e.g. software) for performing the processes and functions described herein (e.g. determinations of parameters and execution of control routines). The memory may be any suitable non-transitory computer readable storage medium, data storage device or devices, and may comprise a hard disk and/or solid state memory (such as flash memory). In some examples, the computer readable instructions may be transferred to the memory via a wireless signal or via a wired signal. The memory may be permanent non-removable memory or may be removable memory (such as a universal serial bus (USB) flash drive). The memory may store a computer program comprising computer readable instructions that, when read by a processor or controller, causes performance of the methods described herein, and/or as illustrated in the Figures. The computer program may be software or firmware or be a combination of software and firmware.

Except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

The invention claimed is:

1. An apparatus configured to supply electrical power to a transport refrigeration unit, the apparatus comprising:
   a power converter including a rectifier, a first inverter and a DC link, internal to the power converter, electrically connected to an output of the rectifier and an input of the first inverter, an input of the rectifier being electrically connectable to a power source external to the apparatus at a connection port of the apparatus and an output of the first inverter being electrically couplable to the transport refrigeration unit;
   a power distribution unit electrically coupled to the DC link of the power converter;
   a battery electrically coupled to the power distribution unit; and
   a second inverter having an input configured to be electrically connected to an electrical generator and an output electrically connected to the power distribution unit or to the DC link of the power converter;
   wherein the second inverter is configured to convert an alternating current voltage supplied at the input into a direct current voltage for supply at the output, and
   wherein the power distribution unit is configured to isolate the DC link from the battery,
   the apparatus further comprising a DC-DC converter connected between the DC link of the power converter and the power distribution unit, wherein the DC-DC converter is configured to:
      convert a voltage supplied to the DC-DC converter by the power distribution unit from a second voltage magnitude to a first voltage magnitude for supply to the DC link, the first voltage magnitude corresponding to an operating voltage of the DC link and the second voltage magnitude corresponding to an operating voltage of the power distribution unit; and
      convert a voltage supplied to the DC-DC converter by the DC link from the first voltage magnitude to the second voltage magnitude for supply to the power distribution unit,
   wherein the DC-DC converter comprises at least one isolation device configured to selectively isolate the DC link from the power distribution unit.

2. The apparatus according to claim 1, wherein the power distribution unit is configured to isolate the DC link from the second inverter when connected to the power distribution unit.

3. The apparatus according to claim 1, wherein the power distribution unit comprises a plurality of thermal fuses, and wherein each of the plurality of thermal fuses is configured to isolate the DC link from the battery or the second inverter.

4. The apparatus according to claim 1, wherein the second inverter is configured to convert a variable-frequency alternating current voltage supplied at the input into a direct current voltage for supply at the output.

5. The apparatus according to claim 1, wherein the output of the first inverter is electrically coupled to the transport refrigeration unit via an output sine-wave filter.

6. The apparatus according to claim 1, wherein the input of the rectifier is electrically couplable to the external power source via an input filter.

7. The apparatus according to claim 1, further comprising a controller configured to:
   determine whether the external power source is connected at the connection port; and
   manage electrical power flow within the apparatus according to whether the external power source is connected at the connection port.

8. The apparatus according to claim 7,
   wherein the controller being configured to manage electrical power flow within the apparatus according to whether the external power source is connected at the connection port includes the controller being configured to:
      in response to a determination that the external power source is not connected at the connection port:
         determine a power demand of the transport refrigeration unit, a power availability associated with the electrical generator and a state of charge of the battery; and
         control electrical power flow within the apparatus based on the determined power availability associated with the electrical generator, the determined power demand of the transport refrigeration unit and the determined state of charge of the battery.

9. The apparatus according to claim 7,
   wherein the controller being configured to manage electrical power flow within the apparatus according to whether the external power source is connected at the connection port includes the controller being configured to:
      in response to a determination that the external power source is connected at the connection port:
         determine a power demand of the transport refrigeration unit, a power availability associated with the external power source and a state of charge of the battery; and
         control electrical power flow within the apparatus based on the determined power availability associated with the external power source, the determined power demand of the transport refrigeration unit and the state of charge of the battery.

10. The apparatus according to claim 7, wherein the controller being configured to manage electrical power flow within the apparatus according to whether the external power source is connected at the connection port includes the controller being configured to:
in response to a determination that the external power source is connected at the connection port:
in response to a determination that excess electrical energy is present within the apparatus, cause electrical power to be supplied from the power converter to the external power source so as to discharge excess electrical energy stored within the apparatus to the external power source.

11. The apparatus according to claim 1, further comprising the transport refrigeration unit, wherein the output of the first inverter is electrically coupled to the transport refrigeration unit.

12. The apparatus according to claim 1, wherein the operating voltage of the power distribution unit corresponds to a voltage of the battery.

13. The apparatus according to claim 12, wherein the operating voltage of the of the DC link is between 600 VDC and 800 VDC.

14. The apparatus according to claim 12, wherein the second voltage magnitude is between 300 VDC and 450 VDC.

15. A vehicle comprising:
an apparatus comprising:
a power converter including a rectifier, a first inverter and a DC link, internal to the power converter, electrically connected to an output of the rectifier and an input of the first inverter, an input of the rectifier being electrically connectable to a power source external to the apparatus at a connection port of the apparatus and an output of the first inverter being electrically couplable to a transport refrigeration unit,
a power distribution unit electrically coupled to the DC link of the power converter,
a battery electrically coupled to the power distribution unit, and
a second inverter having an input configured to be electrically connected to an electrical generator and an output electrically connected to the power distribution unit or to the DC link of the power converter,
wherein the second inverter is configured to convert an alternating current voltage supplied at the input into a direct current voltage for supply at the output; and
wherein the power distribution unit is configured to isolate the DC link from the battery, and
the electrical generator, wherein the electrical generator is mechanically coupled to an axle of the vehicle,
the apparatus further comprising a DC-DC converter connected between the DC link of the power converter and the power distribution unit, wherein the DC-DC converter is configured to:
convert a voltage supplied to the DC-DC converter by the power distribution unit from a second voltage magnitude to a first voltage magnitude for supply to the DC link, the first voltage magnitude corresponding to an operating voltage of the DC link and the second voltage magnitude corresponding to an operating voltage of the power distribution unit; and
convert a voltage supplied to the DC-DC converter by the DC link from the first voltage magnitude to the second voltage magnitude for supply to the power distribution unit,
wherein the DC-DC converter comprises at least one isolation device configured to selectively isolate the DC link from the power distribution unit.

\* \* \* \* \*